(12) United States Patent
Hirao et al.

(10) Patent No.: US 7,515,803 B2
(45) Date of Patent: Apr. 7, 2009

(54) OPTICAL ELEMENT, MANUFACTURING METHOD THEREOF, AND OPTICAL DEVICE

(75) Inventors: Kazuyuki Hirao, 8-94, Tanaka Shimoyanagi-cho, Sakyo-ku, Kyoto-shi, Kyoto (JP) 606-8204; Yasuhiko Shimotsuma, Kyoto (JP); Takahiro Matsubara, Kyoto (JP); Jianrong Qiu, Nara (JP)

(73) Assignees: Kazuyuki Hirao, Kyoto (JP); Kyocera Corporation, Kyoto (JP)

( * ) Notice: Subject to any disclaimer, the term of this patent is extended or adjusted under 35 U.S.C. 154(b) by 0 days.

(21) Appl. No.: 11/764,710

(22) Filed: Jun. 18, 2007

(65) Prior Publication Data
US 2007/0237446 A1    Oct. 11, 2007

Related U.S. Application Data

(62) Division of application No. 11/098,002, filed on Mar. 31, 2005, now abandoned.

(30) Foreign Application Priority Data

Mar. 31, 2004    (JP)    ............... 2004-105891

(51) Int. Cl.
G02B 6/10 (2006.01)
G02B 6/124 (2006.01)
(52) U.S. Cl. ............... 385/129; 385/14; 385/33
(58) Field of Classification Search ............ None
See application file for complete search history.

(56) References Cited

U.S. PATENT DOCUMENTS

| | | | |
|---|---|---|---|
| 4,637,681 A | | 1/1987 | Yamamoto et al. |
| 5,136,677 A | * | 8/1992 | Drexhage et al. ............ 385/123 |
| 5,818,986 A | * | 10/1998 | Asawa et al. ................. 385/24 |
| 5,949,943 A | | 9/1999 | Watanabe et al. ............ 385/129 |
| 6,690,860 B2 | | 2/2004 | Matsumoto et al. ............ 385/37 |
| 6,768,850 B2 | | 7/2004 | Dugan et al. ................. 385/124 |
| 6,826,344 B2 | | 11/2004 | Shimada et al. |
| 6,832,023 B1 | * | 12/2004 | Gaylord et al. ............... 385/37 |

(Continued)

FOREIGN PATENT DOCUMENTS

JP    57186710 A    11/1982

(Continued)

OTHER PUBLICATIONS

Davis, et al., "Writing Waveguides in Glass With A Femtosecond Laser", Optics Letters, Nov. 1, 1996/ vol. 21, No. 21, pp. 1729-1731.

(Continued)

*Primary Examiner*—Omar Rojas
(74) *Attorney, Agent, or Firm*—Hogan & Hartson LLP

(57) ABSTRACT

A photoinduced refractive-index changing region is formed by irradiating while focusing a single beam of pulse laser light having an energy amount to cause a photoinduced change in refractive index onto a light guide of an optical element such as a lens, a mirror, a diffraction grating, a polarizer, or a wavelength filter. In the photoinduced refractive-index changing region, since the refractive index is periodically changed in one direction, of the light propagating through the optical element, only a polarized light penetrates through this photoinduced refractive-index changing region. Accordingly, the photoinduced refractive-index changing region can be functioned as a polarizer.

17 Claims, 12 Drawing Sheets

U.S. PATENT DOCUMENTS

| | | | |
|---|---|---|---|
| 6,937,797 B2 * | 8/2005 | Mizuno et al. | 385/43 |
| 7,095,931 B2 * | 8/2006 | Sezerman et al. | 385/123 |
| 2001/0021293 A1 | 9/2001 | Kouta et al. | 385/37 |
| 2002/0054738 A1 | 5/2002 | Matsushima et al. | |
| 2002/0117624 A1 | 8/2002 | Katayama et al. | |
| 2003/0156813 A1 | 8/2003 | Terakawa et al. | |

FOREIGN PATENT DOCUMENTS

| | | |
|---|---|---|
| JP | 57198410 A | 12/1982 |
| JP | 58034408 A | 2/1983 |
| JP | 59029210 A | 2/1984 |
| JP | 59081612 A | 5/1984 |
| JP | 59173032 U | 11/1984 |
| JP | 60059547 A | 4/1985 |
| JP | 61200507 A | 9/1986 |
| JP | 61206904 U | 12/1986 |
| JP | 62295003 A | 12/1987 |
| JP | 03059606 A | 3/1991 |
| JP | 11167033 A | 6/1999 |
| JP | 2000047046 A | 2/2000 |
| JP | 2000155225 A | 6/2000 |
| JP | 2000-241779 | 9/2000 |
| JP | 2000249859 A | 9/2000 |
| JP | 2001236644 A | 8/2001 |
| JP | 2001242338 A | 9/2001 |
| JP | 2001337252 A | 12/2001 |
| JP | 2002107558 A | 4/2002 |
| JP | 2002-139638 | 5/2002 |
| JP | 2002169046 A | 6/2002 |
| JP | 2002249607 A | 9/2002 |
| JP | 2002328246 A | 11/2002 |
| JP | 2003-004963 | 1/2003 |
| JP | 2003043285 A | 2/2003 |
| JP | 2003-098369 | 4/2003 |
| JP | 2003-098399 | 4/2003 |
| JP | 2003177264 A | 6/2003 |
| JP | 2003-240991 | 8/2003 |
| JP | 2003236835 A | 8/2003 |
| JP | 2003255157 A | 9/2003 |
| JP | 2003315608 A | 11/2003 |
| JP | 2003329822 A | 11/2003 |
| JP | 2004013668 A2 | 2/2004 |

OTHER PUBLICATIONS

Shimotsuma, et al., "Self-Organized Nanogratings in Glass Irradiated by Ultrashort Light Pulses", Physical Review Letters, Dec. 12, 2003/ vol. 91, No. 24, pp. 247405-1-247405-4.

Partial English translation of Japanese office action for corresponding Japanese application 2004105891 lists the references above.

* cited by examiner

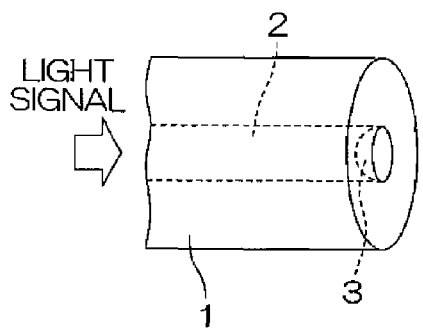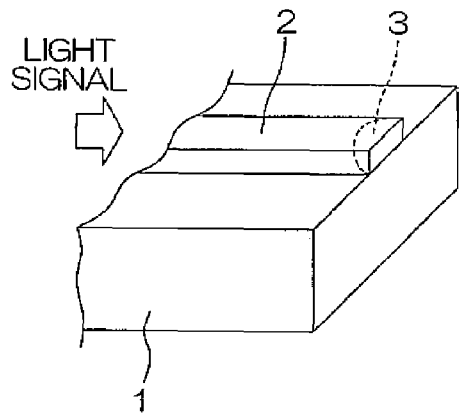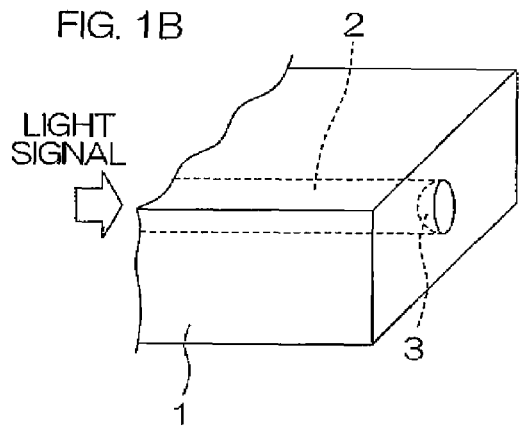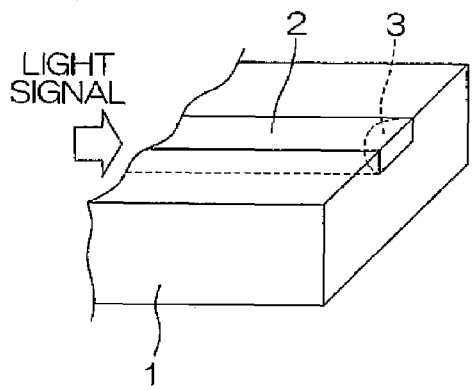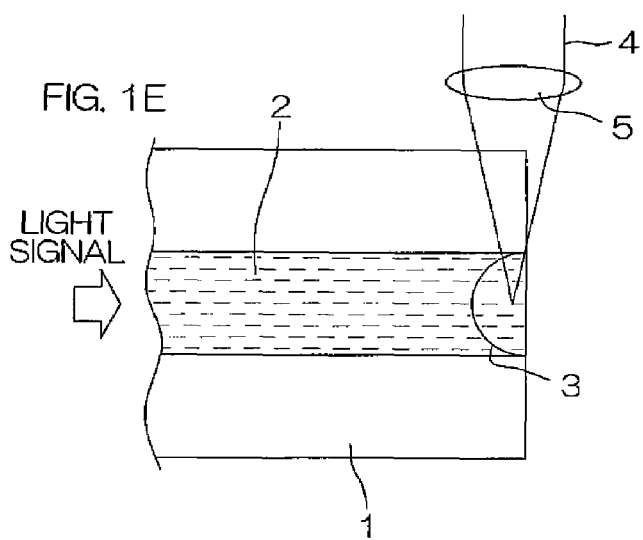

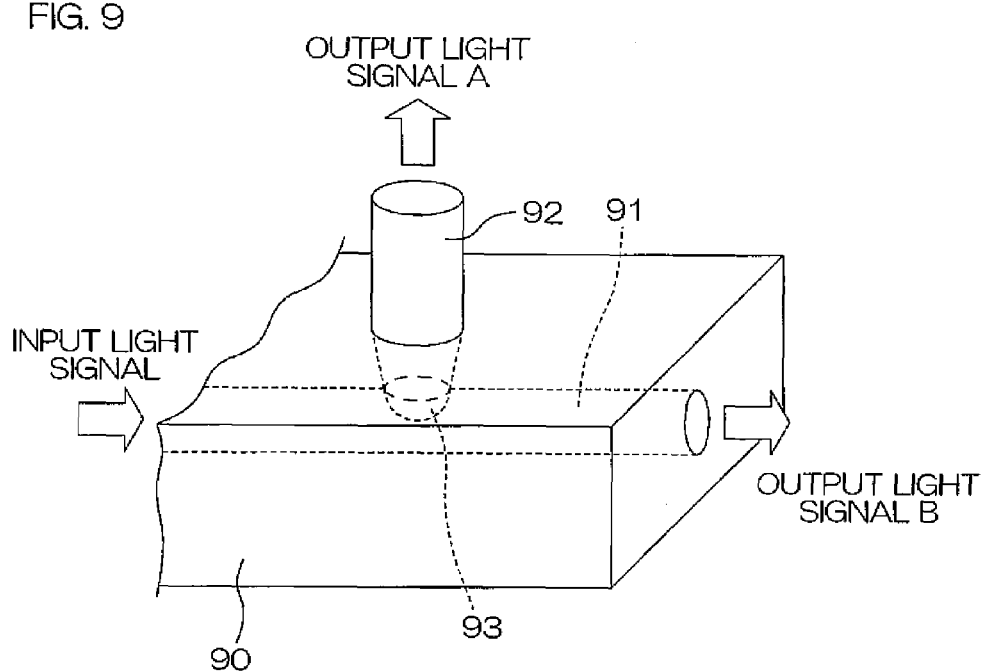
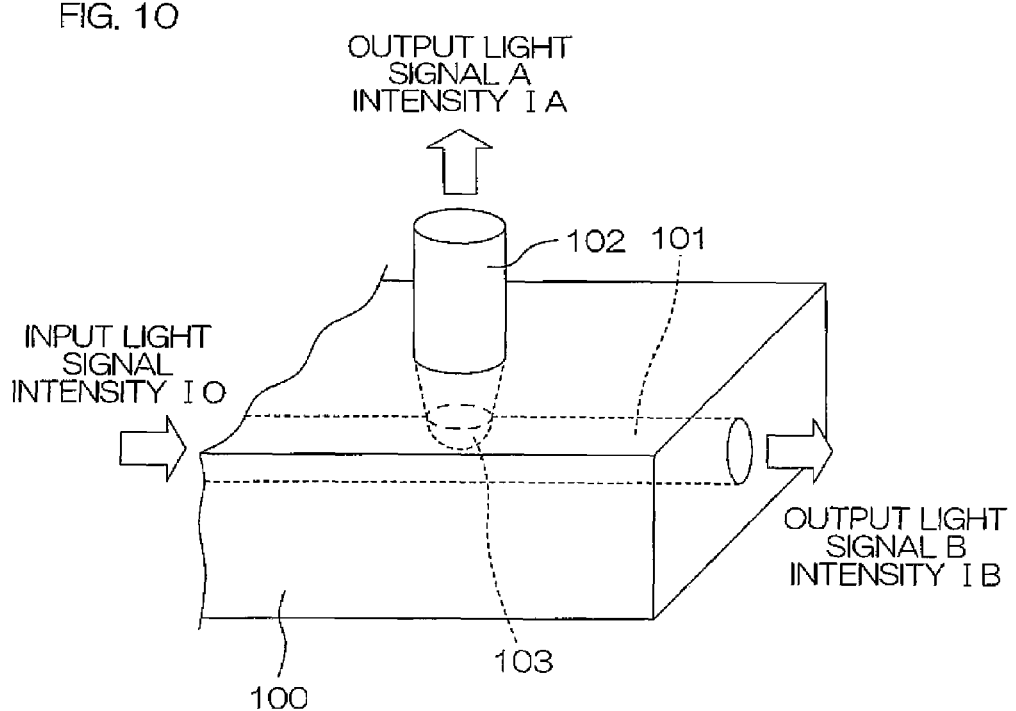

OPTICAL ELEMENT, MANUFACTURING METHOD THEREOF, AND OPTICAL DEVICE

CROSS-REFERENCE TO THE RELATED APPLICATION

This is a divisional of application Ser. No. 11/098,002 filed Mar. 31, 2005, the entire contents of which are incorporated by reference. This application also claims benefit of priority under 35 U.S.C. § 119 to Japanese Patent Application No. 2004-105891 filed Mar. 31, 2004, the entire contents of which are incorporated by reference.

BACKGROUND OF THE INVENTION

1. Field of the Invention

The present invention relates to an optical element which realizes various optical effects by forming a photoinduced refractive-index changing region at a predetermined position of a light guide, a method thereof, and an optical device mounted with the same optical element. For the optical element, various optical elements such as an optical fiber, an optical integrated circuit, and a simple lens can be mentioned.

2. Description of the Prior Art

An optical element for realizing various optical effects is formed by forming, in a core or light guide of an optical fiber to propagate light signals, functional components such as a lens, a mirror, a diffraction grating, and a polarizer to control physical properties of light. An optical element is fabricated by mounting this optical element on an optical substrate or the like. On the other hand, phenomena have been confirmed such that, by irradiating a focused pulse laser light with a femtosecond-order ($10^{-12}$ to $10^{-15}$ seconds) pulse width onto the inside of a transparent material such as glass, conditions of an atomic arrangement, a valence, an atomic defect and the like in the vicinity of a light focusing portion are changed, and refractive index is made higher than that of a portion which has not irradiated with the pulse laser light or a region where refractive index is periodically modulated is formed in the vicinity of a light focusing portion as a result of interference of the pulse laser light with plasma generated in the vicinity of the light focusing portion, and these have been called a photoinduced change in refractive index, a nano-grating formation or the like.

In the present specification, the above-described grating formation is also considered as a mode of change in refractive index, and these phenomena such as a change in refractive index and a nano-grating formation will be generally referred to as "photoinduced refractive-index change."

The foregoing optical element is generally formed by coupling separately prepared functional components such as a lens, a mirror, and a diffraction grating to an optical substrate, however, since the functional components are complicated in structure and also large in size, there is a problem such that the optical element itself is increased in size.

Furthermore, for manufacturing the optical element, a step for manufacturing an optical substrate, a step for manufacturing functional components such as a lens, a mirror, and a diffraction grating, and a step for mounting these functional components on the optical substrate are necessary, therefore, manufacturing processes are complicated, and the manufacturing cost is also increased.

In addition, even when coupling of the functional components to an optical fiber is intended, since the core diameter of the optical fiber is small, high-precision processing is difficult, and the manufacturing cost is increased.

Therefore, it is an object of the present invention to provide a small-sized and easily-manufacturable optical element on which functional components such as a lens, a mirror, and a diffraction grating can be integrally formed and which can realize a variety of optical effects.

Moreover, it is an object of the present invention to provide a method for manufacturing an optical element whereby a small-sized optical element can be simply and swiftly manufactured by integrally forming functional components such as a lens, a mirror, and a diffraction grating after an optical substrate manufacturing step.

Furthermore, it is an object of the present invention to provide an optical device mounted with the above-described optical element.

SUMMARY OF THE INVENTION

An optical element of the present invention is characterized in that a photoinduced refractive-index changing region which is formed by irradiating while a focused pulse laser light having an energy amount to cause a photoinduced change in refractive index in said optical element.

For such an optical element with a photoinduced refractive-index changing region formed, since the photoinduced refractive-index changing region is formed by a simple step of a focusing irradiation of pulse laser light, in comparison with external equipment of various functional components such as a lens and a diffraction grating, manufacturing is easy and moreover, a small-sized optical element can be realized.

It is most efficient, in realizing optical functions, to form the photoinduced refractive-index changing region in a light guide through which light propagates.

For example, the photoinduced refractive-index changing region is formed at a light incident end portion, light exiting end portion, or middle portion of the light guide or at a boundary between the light guide and a peripheral portion thereof. By forming the photoinduced refractive-index changing region at the light incident end portion or light exiting end portion of the light guide, at the light inputting/outputting time of the optical element, a light signal inputting/outputting function when externally taking in light or externally taking out light can be realized. In addition, by forming the photoinduced refractive-index changing region at the middle portion of the light guide, a light signal processing function inside the optical element can be easily realized. In addition, if the photoinduced refractive-index changing region is formed at the boundary between the light guide and peripheral portion thereof, it becomes possible to easily perform a light signal inputting/outputting process when taking in light from or taking out light of another internal or external light guide of the optical element.

In addition, for a simple lens, a simple prism or the like, a plurality of photoinduced refractive-index changing regions are preferably formed inside the optical element.

The photoinduced refractive-index changing region can realize a light focusing function to focus light propagating through the light guide, a refracting function to refract light propagating through the light guide, a reflecting function to reflect light propagating through the light guide, an optical diffracting function to diffract light propagating through the light guide, an optical attenuating function to attenuate light propagating through the light guide, a wavelength filter function to select a light with a specific wavelength propagating through the light guide, a polarizing function to transmit a light in a specific polarizing direction propagating through the light guide or the like.

By the light focusing function, a function similar to that when a lens is attached to an optical element can be provided. Namely, an efficient optical coupling becomes possible in the light guide or with another optical element.

By the refracting function or reflecting function, a function similar to that when a prism or mirror is attached to an optical element can be provided. For example, it becomes possible to easily perform a light path conversion inside the optical element, whereby a reduction in size of the optical element can be realized.

By the optical diffracting function, similar to when a diffraction grating is attached to an optical element, it becomes possible to easily reflect or refract light with a specific wavelength. Accordingly, light path division according to the wavelength can be performed in the optical element, whereby a function as a small-sized spectroscope can be realized.

By the optical attenuating function, similar to when an optical attenuating filter is attached to an optical element, it becomes possible to easily perform a signal processing of light.

By the wavelength filter function, similar to when a wavelength filter is attached to an optical element, it becomes possible to easily perform a color signal processing of light.

By the polarizing function, similar to when an optical polarizer is attached to an optical element, it becomes possible to easily perform a light signal processing based on polarization.

The optical element may be either an optical fiber or an optical substrate wherein a light guide has been formed in a specific shape. The latter optical substrate with a specific-shaped light guide is used for an optical integrated circuit or the like. As the specific-shaped optical substrate, a buried or protruded light guide formed on an optical substrate or a two-dimensionally expanding plate-like light guide formed on an optical substrate can be mentioned.

The light guide may be branched on the optical substrate or inside the optical substrate. By forming a photoinduced refractive-index changing region in such a branched light guide, for optical coupling or optical branching, a large variety of functions can be added. The refractive-index changing region can be formed at a light guide after branching or at a branching portion of a branched light guide.

In addition, if modulating electrodes are formed on a light guide, various types of light signal processes such as optical switching and optical modulation can be performed. By forming a photoinduced refractive-index changing region, a large variety of functions can be added to such light signal processes.

In addition, when the optical element of the present invention is an optical fiber, a plurality of optical fibers each provided with a photoinduced refractive-index changing region formed at a core end portion thereof can be arranged while making their end portions in contact with a reflecting member. This is an advantageous construction when reducing the optical element in size by use of a refracting/reflecting function of a photoinduced refractive-index changing region. For example, if a polarization-plane rotating element is coupled between the end portions of the plurality of optical fibers, the plane of polarization of optical fibers can be easily changed.

When the photoinduced refractive-index changing region exists at a middle portion of a light guide, another optical element can be connected to the position, in the light guide, where the photoinduced refractive-index changing region has been formed. By use of functions such as light focusing and refraction/reflection by the photoinduced refractive-index changing region, it can be easily performed to take out light halfway through the light guide or introduce light halfway through the light guide.

In addition, as an example when a photoinduced refractive-index changing region exists inside the optical element, a lens such as a spherical lens or an aspherical lens can be mentioned. In this case, by utilizing the optical diffracting function, wavelength filter function, polarizing function and the like by the photoinduced refractive-index changing region, lenses having these functions can be realized.

A method for manufacturing an optical element of the present invention is characterized in the steps of preparing an optical substrate made of an inorganic material, an organic material, or a crystalline material showing an electro-optic effect and forming a photoinduced refractive-index changing region by irradiating while focusing a pulse laser light having an energy amount to cause a photoinduced change in refractive index onto the optical substrate.

For an optical element manufactured by this method, refractive index is changed or high-refractive index planes and low-refractive index planes alternatively appear at predetermined pitches. By utilizing these various optical functions of a photoinduced refractive-index changing region, a small-sized multifunctional optical element as described above can be fabricated.

In order to form a photoinduced refractive-index changing region, it is preferable that the pulse laser light has a pulse width of $10^{-12}$ to $10^{-15}$ seconds, which are the order of so-called femtoseconds.

In addition, in order to form an effective photoinduced refractive-index changing region, it is preferable that the pulse laser light to be focused onto the light guide has a power density of $10^8 W/cm^2$ or more, a pulse repetition frequency of 100 MHz or less, and pulse energy of 0.1 μJ/pulse to 10 μJ/pulse. Here, the pulse of a pulse laser light may be a single pulse.

According to the method for manufacturing an optical element of the present invention, by irradiating while focusing a pulse laser light onto an optical element or by utilizing interference of the pulse laser light with plasma generated inside the light focusing position, an optical element wherein a photoinduced refractive-index changing region has been formed can be simply manufactured by only irradiating a pulse laser light without going through complicated steps.

An optical device of the present invention is characterized in mounting the aforementioned optical element with a photoinduced refractive-index changing region on the device. By making use of small-sized easily-manufacturable features of this optical element, an optical device which as a whole is small-sized and low in cost can be manufactured. An optical device mounted with this optical element is used in the field of, for example, optical communications, optical information processing, optical information recording and the like.

As in the above, according to the present invention, by integrally forming a photoinduced refractive-index changing region in an optical element, various effects such as a reduction in the number of components and size of the optical element, simplification in fabrication processes including optical axis alignment, and a reduction in manufacturing cost can be expected.

The aforementioned or other further advantages, features, and effects of the present invention will become more apparent by the following description of embodiments with reference to the accompanying drawings.

BRIEF DESCRIPTION OF THE DRAWINGS

FIG. 1A is a view showing a structure of an optical element wherein a photoinduced refractive-index changing region 3 of a lens, a mirror, a diffraction grating and the like has been integrally formed at an end portion of an optical fiber light guide 2;

FIG. 1B to FIG. 1D show cases where an optical element has a structure wherein a light guide has been formed on an optical substrate;

FIG. 1E is a sectional view showing a condition wherein a pulse laser light 4 is being irradiated, while being focused through a focusing element 5 such as a lens, onto an end portion of a light guide 2;

FIG. 8A and FIG. 8B are views showing a polarizer-integrated optical element wherein a photoinduced refractive-index changing region 72 which functions as a polarizer has been formed at a light guide middle portion by irradiating while focusing a pulse laser light with a femtosecond-order pulse width onto a light guide 71 of an optical element, wherein FIG. 8A shows a case where the optical element is an optical fiber and FIG. 8B shows a case where the optical element has a structure wherein a light guide 74 has been formed on an optical substrate 73 made of silica glass;

FIG. 9 is a view showing an optical element wherein a photoinduced refractive-index changing region 93 has been formed by irradiating while focusing a pulse laser light with a femtosecond-order pulse width onto a boundary portion between a light guide 91 of the optical element and a clad 90;

FIG. 10 is a view showing an optical element wherein a photoinduced refractive-index changing region 103 has been formed by irradiating while focusing a pulse laser light with a femtosecond-order pulse width onto a boundary portion between a light guide 101 of the optical element and a clad 100;

FIG. 13A and FIG. 13B show an optical element having a two-dimensionally expanding plate-like light guide 133 and clads 134, wherein FIG. 13A shows a perspective view of the optical element and FIG. 13B shows a horizontal sectional view including the plate-like optical element light guide 133; and FIG. 14A and FIG. 14B are side views showing an optical element wherein a plurality of polarizers 141 or 143 have been respectively formed by irradiating while focusing a pulse laser light with a femtosecond-order pulse width onto the inside of a spherical lens 140 or ball lens 142, wherein FIG. 14A shows a case of a spherical lens and FIG. 14B shows a case of a ball lens.

DETAILED DESCRIPTION OF THE PREFERRED EMBODIMENTS

Figure 2A:
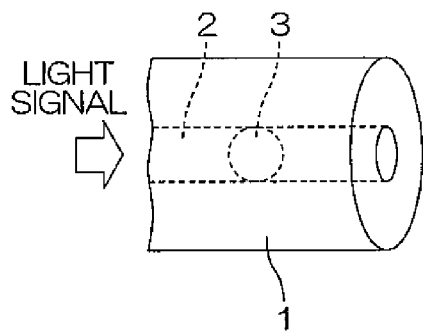
FIG. 2A is a view showing an optical element wherein a photoinduced refractive-index changing region 3 of a lens, a mirror, a diffraction grating and the like has been integrally formed at a middle portion of an optical fiber light guide 2.

FIG. 1A to FIG. 1E are views showing structures of an optical element wherein a photoinduced refractive-index changing region 3 having a function of a lens, a mirror, a diffraction grating and the like has been integrally formed at an end portion of an optical fiber light guide 2, which is a part through which light propagates inside the optical element.

FIG. 1A shows a case where the optical element is an optical fiber having a core 2, and FIG. 1B to FIG. 1D show cases where the optical element is composed of an optical substrate 1 on which a light guide 2 has been formed. FIG. 1B shows a case where the light guide 2 has been formed in a manner buried inside the optical substrate 1, FIG. 1C shows a case where the light guide 2 has been formed in a manner protruded on the surface of the optical substrate 1, and FIG.

1D shows a case where the light guide 2 has been formed in a manner buried in the surface of the optical substrate 1.

In the present embodiment, for the optical fiber, a commercially-available $SiO_2$ optical fiber is used, and for the light guide 2 on the optical substrate 1, a light guide for which $GeO_2$ has been doped in a light guide portion of a $SiO_2$ optical substrate 1 is used. The optical fiber may be either a single mode or a multi mode (the same applies in the following.)

FIG. 1E is a sectional view showing a condition wherein a pulse laser light 4 with a femtosecond-order pulse width is being irradiated, while being focused through a focusing element 5 such as a lens, onto an end portion of a light guide 2. By irradiating the pulse laser light 4 through the focusing element 5 onto the end portion of the light guide 2, a phenomenon of photoinduced refractive-index change is raised, thus a photoinduced refractive-index changing region 3 having various optical functions such as a lens, a mirror, and a diffraction grating is formed at the end portion of the light guide 2.

Here, with regard to the size of the photoinduced refractive-index changing region 3, this can be provided within the light guide 2 by regulating conditions such as pulse energy and irradiation time of a pulse laser light to be irradiated.

According to the present embodiment, by forming a photoinduced refractive-index changing region at an end portion of an optical fiber or a light guide on an optical substrate, various functions such as a lens function for focusing light, a mirror function for changing the light propagating direction, an optical attenuator function for changing the light intensity, a wavelength filter function for filtering a specific wavelength of light, and a polarizing function for transmitting light in a specific polarizing direction can be provided for an optical element.

FIG. 2A to FIG. 2E show structures of an optical element wherein a photoinduced refractive-index changing region has been integrally formed at a middle portion of a light guide of the optical element.

Figure 2B:
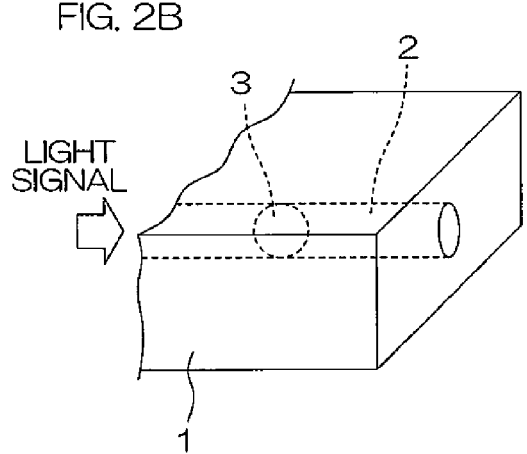
FIG. 2B to FIG. 2D show cases where an optical element has a structure wherein a light guide 2 has been formed on an optical substrate 1.
Figure 2C:
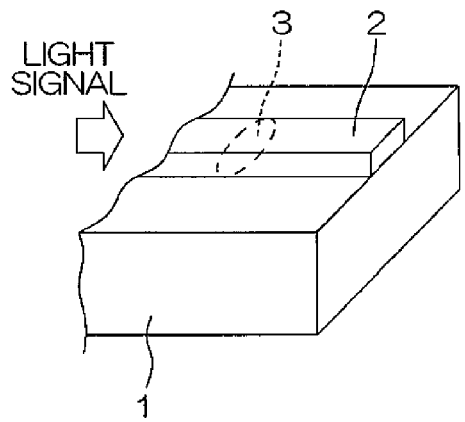
Figure 2D:
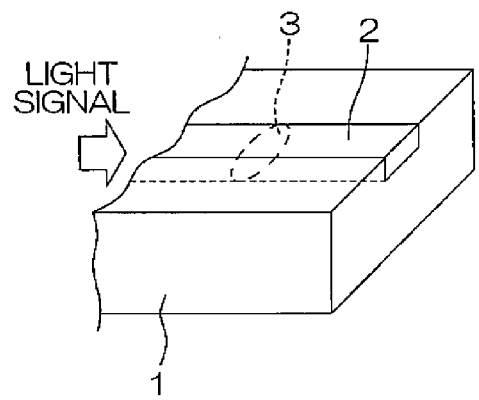

FIG. 2A shows a case where the optical element is an optical fiber, and FIG. 2B to FIG. 2D show cases where the optical element is composed of an optical substrate 1 on which a light guide 2 has been formed. FIG. 2B shows a case where the light guide 2 has been formed in a manner buried inside the optical substrate 1, FIG. 2C shows a case where the light guide 2 has been formed in a manner protruded on the surface of the optical substrate 1, and FIG. 2D shows a case where the light guide 2 has been formed in a manner buried in the surface of the optical substrate 1.

In the present embodiment, similar to the embodiment of FIG. 1A to FIG. 1E, for the optical fiber, a commercially-available $SiO_2$ optical fiber is used, and for the light guide 2 on the optical substrate 1, a light guide for which $GeO_2$ has been doped in a light guide portion of an $SiO_2$ optical substrate is used.

Figure 2E:
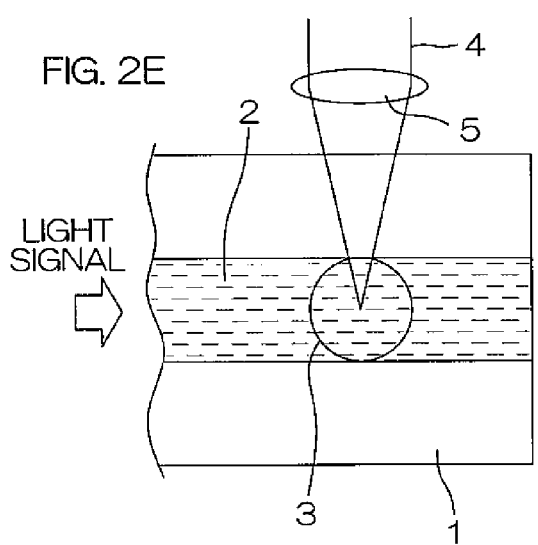
FIG. 2E is a sectional view showing a condition wherein a pulse laser light 4 is being irradiated, while being focused through a focusing element 5 such as a lens, onto a middle portion of a light guide 2.

FIG. 2E shows a condition wherein, by irradiating, while focusing through a focusing element 5 such as a lens, a pulse laser light 4 with a femtosecond-order pulse width onto a middle portion of a light guide 2, a photoinduced refractive-index changing region 3 having various optical functions such as a lens, a mirror, and a diffraction grating has been formed at a middle portion of the light guide of the optical element.

Here, similar to the aforementioned embodiment, with regard to the size of the photoinduced refractive-index changing region 3, this can be fitted to the light guide size by regulating conditions such as pulse energy and irradiation time of a pulse laser light to be irradiated.

According to the present embodiment, by forming a photoinduced refractive-index changing region at a middle portion of an optical fiber or a light guide on an optical substrate, various functions such as a lens function for focusing light, a mirror function for changing the light propagating direction, a diffraction grating function for spectroscopy, an optical attenuator function for changing the light intensity, a wavelength filter function for filtering a specific wavelength of light, and a polarizing function for transmitting light in a specific polarizing direction can be provided for an optical element.

FIG. 3A to FIG. 3E show structures of an optical element wherein a photoinduced refractive-index changing region has been integrally formed at a boundary portion between a light guide of the optical element and an optical substrate part (referred to as a clad) surrounding the same.

Figure 3A:
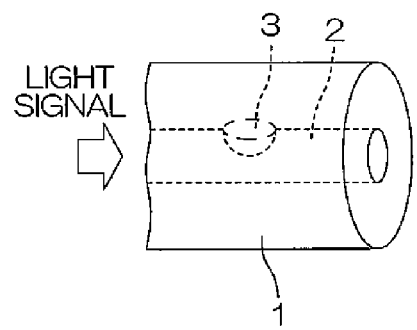
FIG. 3A is a view showing an optical element wherein a photoinduced refractive-index changing region 3 has been integrally formed at a boundary portion between an optical fiber light guide 2 and a clad 1.
Figure 3C:
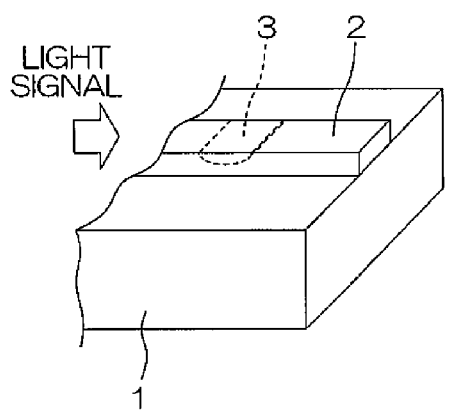
FIG. 3B to FIG. 3D show cases where an optical element has a structure wherein a light guide 2 has been formed on an optical substrate 1.
Figure 3B:
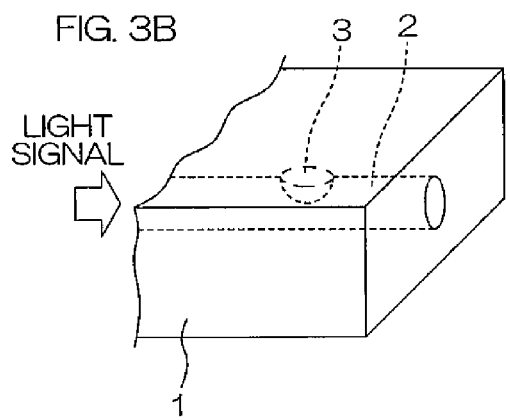
Figure 3D:
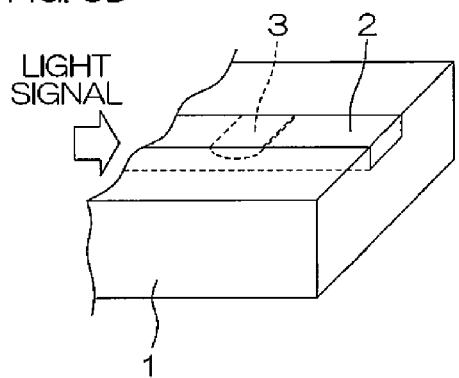

FIG. 3A shows a case where the optical element is an optical fiber, and FIG. 3B to FIG. 3D show cases where the optical element is composed of an optical substrate 1 on which a light guide 2 has been formed. FIG. 3B shows a case where the light guide 2 has been formed in a manner buried inside the optical substrate 1, FIG. 3C shows a case where the light guide 2 has been formed in a manner protruded on the surface of the optical substrate 1, and FIG. 3D shows a case where the light guide 2 has been formed in a manner buried in the surface of the optical substrate 1.

In the present embodiment, similar to the embodiments of FIG. 1A to FIG. 1E and FIG. 2A to FIG. 2E, for the optical fiber, a commercially-available $SiO_2$ optical fiber is used, and for the light guide 2 on the optical substrate 1, a light guide for which $GeO_2$ has been doped in a light guide portion of an $SiO_2$ optical substrate is used.

Figure 3E:
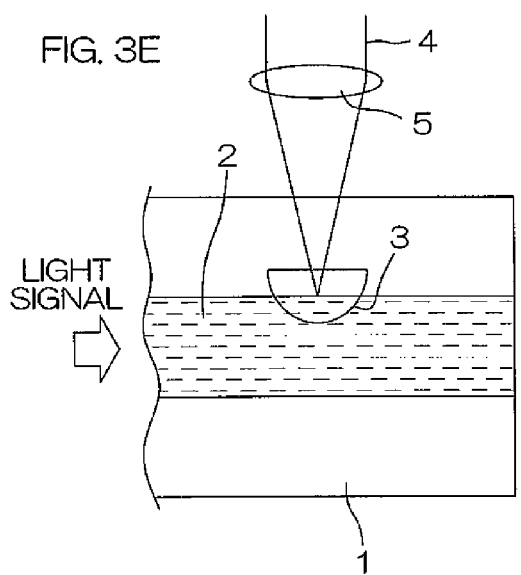
FIG. 3E is a sectional view showing a condition wherein a pulse laser light 4 is being irradiated, while being focused through a focusing element 5 such as a lens, onto a boundary portion between a light guide 2 and a clad 1.

FIG. 3E shows a condition wherein, by irradiating, while focusing through a focusing element 5 such as a lens, a pulse laser light 4 with a femtosecond-order pulse width onto a boundary portion between a light guide 2 and a clad surrounding the same, a photoinduced refractive-index changing region 3 having various optical functions such as a lens, a mirror, and a diffraction grating has been formed at the boundary portion between the light guide 2 and a clad of the optical element.

Here, similar to the aforementioned embodiments, with regard to the size of the photoinduced refractive-index changing region 3, this can be fitted to the light guide size by regulating conditions such as pulse energy and irradiation time of a pulse laser light to be irradiated.

According to the present embodiment, by forming a photoinduced refractive-index changing region at a boundary portion between an optical fiber or a light guide on an optical substrate and a clad, various functions such as a lens function for focusing light, a mirror function for changing the light propagating direction, an optical attenuator function for changing the light intensity, a wavelength filter function for filtering a specific wavelength of light, and a polarizing function for filtering light in a specific polarizing direction can be provided for an optical element.

Next, constituent materials of an optical element according to an embodiment of the present invention will be described.

For the optical substrate, an inorganic material, an organic material, an anisotropic crystalline material showing an electro-optic effect or the like can be used. The above-mentioned inorganic material and organic material can be either an isotropic material or an anisotropic material.

For the inorganic material, for example, glass consisting mainly of $SiO_2$ can be mentioned.

In addition, for the organic material, polyethylene terephthalate, polyacetal, polycarbonate, polyfluorocrbonate, polyamide, polyimide, silicone, polyphenylene oxide, polysulfone, polyphenylene sulfide, polybutylene terephthalate, polyarylate, polyamideimide, polyethersulfone, polyarylate, polyetherketone, polyetherimide, polymethyl methacrylate, polyacrylate, crosslinked acrylate, polysiloxane, norbornene, an epoxy resin, a phenoxy resin, triacetylcellulose, or fluorine-denatured substances of these, or organic materials mixed with at least one or more of these can be mentioned.

In addition, for the crystalline material showing an electro-optic effect, for example, a $\beta$-$BaB_2O_4$ crystal, a $LiNbO_3$ crystal, a $LiTaO_3$ crystal, a $KH_2PO_4$ crystal, a $Bi_{12}SiO_{20}$ crystal, a $Bi_4Ge_3O_{12}$ crystal, or a quartz crystal can be mentioned.

For the pulse laser light to be irradiated onto the optical element, a pulse laser light oscillating from an ultrashort-pulse laser device such as a $Ti:Al_2O_3$ (titanium sapphire) laser is used. The $Ti:Al_2O_3$ laser oscillates, by its mode lock mechanism, a pulse light of femtosecond-order pulse width ($10^{-12}$ to $10^{-15}$ seconds) is irradiated. Although a pulse light wavelength is variable (100 nm to 2000 nm), this is set to a wavelength to allow the pulse laser light to penetrate through the optical substrate (for example, 800 nm).

The above-mentioned pulse laser light is focused by a focusing element and is regulated so that its light focal point is positioned in a light guide of the optical element through which a light signal propagates. Concretely, the pulse laser light is regulated so that the light focal point is positioned, in FIG. 1C, at a light guide end portion, and in FIG. 2C, at a light guide middle portion, and in FIG. 3C, at a boundary portion between the light guide and clad.

Into this light focal point, a pulse laser light having a power density of $10^8 W/cm^2$ or more is focused. Thereby, inside the light focal point, a phenomenon of photoinduced refractive-index change is raised, and a region which is higher in refractive index than the clad of the optical element is formed. Furthermore, if interference between the laser light and plasma which is raised at the light focal point occurs, a periodic structure region wherein high-refractive-index changing regions and low-refractive-index changing regions are repeatedly generated at pitches of 1 µm or less is formed.

Although irradiation time is not limited, this is to be a time for which a photoinduced refractive-index changing region to sufficiently exhibit optical functions is formed. For example, this can extend for a few seconds per one photoinduced refractive-index changing region.

Here, the power density has a value expressed by dividing output power (W) expressed by "a peak value (J) of output energy/a pulse width (second)" per unit area of irradiation. If the power density is less than $10^8 W/cm^2$, an effective change in refractive index or periodic structure may not be formed inside the light focusing position. The higher the pulse energy is, the greater the amount of change in refractive index becomes, and the clearer the repetition of the high-refractive-index changing regions and low-refractive-index changing regions becomes (a greater difference in refractive index.)

However, if a laser light with an excessive pulse energy amount is irradiated, a cavity defect is formed by a thermal effect at the light focusing position. Therefore, although this is different depending on the composition of the optical substrate, power density of the pulse laser light is regulated by a repetition frequency so as not to exceed a threshold value at which a cavity defect is formed. Concretely, while taking productivity into consideration, a possible lower limit of the repetition frequency of the pulse laser light is set to 1 Hz, preferably, 10 kHz, and more preferably, 100 kHz, and a possible upper limit is set to 100 MHz. Here, the above-described pulse laser light may be a single-shot light pulse (a large number of frequency components are included in the single-shot light pulse.)

For regulating the energy of pulse laser light to be between a threshold value at which a photoinduced refractive-index changing region is formed inside the light focusing position and a threshold value at which a cavity defect is formed and furthermore, for forming a photoinduced refractive-index changing region with a large amount of change in refractive index or a photoinduced refractive-index changing region with excellent periodicity whose periodic pitches are uniform and whose principal planes are identical in width and are, in directionality, regularly arranged in an identical direction, although this is different depending on the type of the optical substrate, it is desirable to regulate the energy per one pulse of a pulse laser light to be irradiated to be between 0.1 µJ/pulse to 10 µJ/pulse.

The intensity of the above-described laser light can be regulated by making the same pass through an ND filter or the like.

A pulse laser light is focused by a focusing element such as a lens. The shape of a region having the above-described periodic structure is basically spherical. A pulse laser light having a pulse energy for which the above-described photo-induced refractive-index change is to be produced receives a spatial Kerr effect, which is a three-dimensional nonlinear optical effect, during propagation through an optical substrate, the shape of a light focusing position of the pulse laser light is desirably focused into a sphere, and the diameter of this sphere becomes in a range of 0.1 µm to 1 mm.

Furthermore, for a polarizing direction of the above-described pulse laser light, a linear polarization is preferably used. For this, a polarizing direction of the pulse laser light can be selected by making the same pass through a polarizing plate or the like. In addition a wavelength of the above-described pulse laser light can be converted by making the same pass through a nonlinear optical crystal generating higher harmonics.

By irradiating while focusing a pulse laser light into a predetermined position of a light guide of an optical element while setting a polarizing direction, an intensity, and a wavelength of the pulse laser light as described above, a refractive index of the inside of a light focal point can be made higher than that of the surrounding light guide and clad, and a diffraction grating wherein high-refractive-index changing regions and low-refractive-index changing regions are repeatedly generated can be formed at a predetermined position of a light guide of an optical element integrally with the optical element.

As in the above, according to the present embodiment, as a result of the light focal point becoming higher in refractive index than of the surrounding clad, a function as a light focusing lens is provided. In addition, as a result of the formation of a diffraction grating wherein high-refractive-index changing regions and low-refractive-index changing regions are repeatedly generated, functions as a reflecting mirror, an optical attenuator, a wavelength filter, and a polarizer are provided.

Hereinafter, detailed embodiments will be described based on examples.

EXAMPLES

Example 1

Figure 4A:
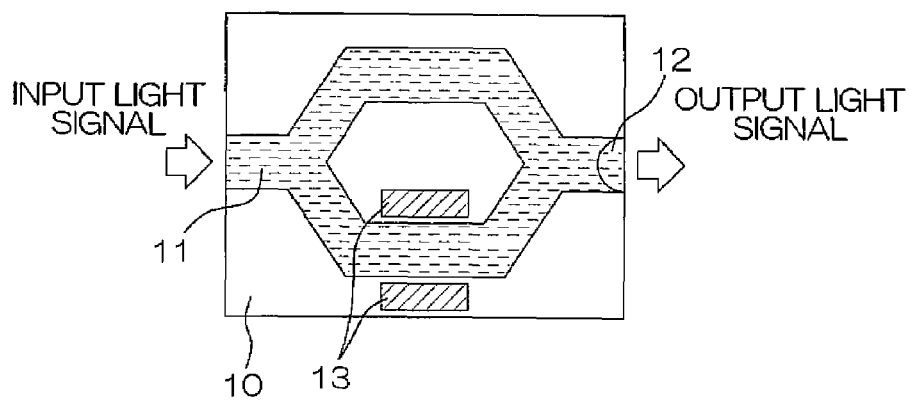
FIG. 4A is a view showing an optical element which is functioned as a lens by irradiating while focusing a pulse laser light onto an output end portion of an optical modulator to raise reflectance.
Figure 4B:
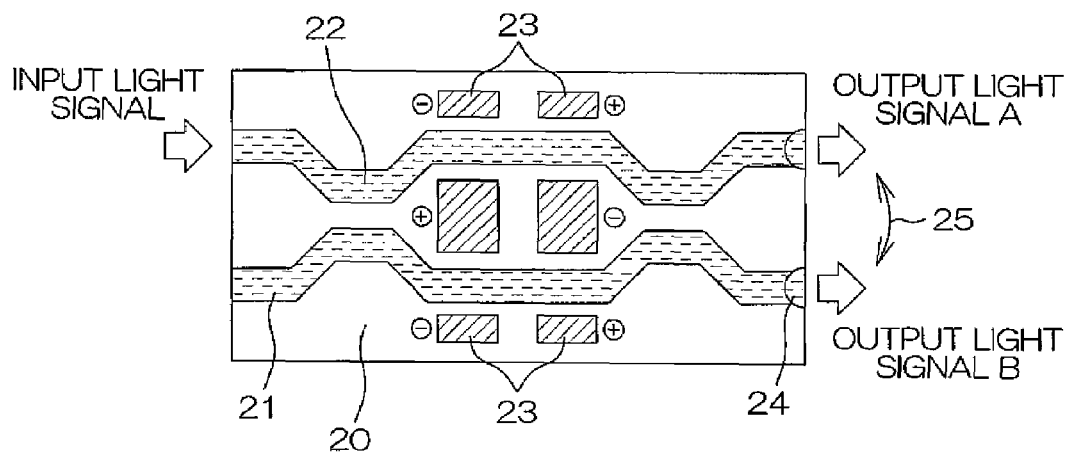
FIG. 4B is a view showing an optical element which is functioned as a lens by irradiating while focusing a pulse laser light onto an output end portion of an optical switch element to raise reflectance.

FIG. 4A and FIG. 4B show structures of an optical element wherein a photoinduced refractive-index changing region 12 has been formed at a light guide end portion of the optical element made of an optical crystal showing an electro-optic effect. As the optical crystal showing an electro-optic effect, although a LiNbO₃ crystal has been used, this is not particularly limited as long as it is a crystalline material showing an electro-optic effect. In addition, although a buried light guide has been used as a light guide 11 on an optical substrate 10, this may be a protruded light guide or the like as long as it is a light guide to propagate light.

FIG. 4A is a plan view showing an example of an optical modulator. This optical modulator has a light guide 11 which is branched into two paths and merged halfway therethrough. For one of the branched light guide paths, modulating electrodes 13 have been provided.

An input light signal is separated into two paths halfway through the light guide 11, and one thereof is phase-modulated by a voltage applied to the modulating electrodes 13. The light guide paths are then again merged into a single light guide, and at this time, intensity of the light signal is modulated in accordance with a depth of the above-described phase modulation.

Onto an end portion of the merged light guide, a pulse laser light with a femtosecond-order pulse width was irradiated while being focused to raise the refractive index, whereby a photoinduced refractive-index changing region 12 to function as a lens was formed.

When a light signal was inputted into an optical modulator and an electric signal was inputted into the modulating electrodes 13, the beam diameter of an output light signal could be expanded while a modulating function of light was maintained.

FIG. 4B shows a plan view showing an example of an optical switch. This switch has two light guides 21 and 22, and in the two light guides 21 and 22, mutual interference regions are provided at two positions. At parts sandwiched between these mutual interference regions, modulating electrodes 23 are provided. The modulating electrodes 23 apply, to the two light guides 21 and 22, a modulating voltage in mutually opposite phases.

Onto output end portions of the respective light guides 21 and 22, a pulse laser light with a femtosecond-order pulse width was irradiated while being focused in, for example, a vertical direction to the page surface to raise the refractive index, whereby a photoinduced refractive-index changing region 24 was formed.

An input light signal which has been inputted into one light guide 22 is branched off, at the mutual interference region, into the other light guide 21, as well. The respective lights receive, by a voltage applied to the modulating electrodes 23, mutually opposite phase modulations (in a phase advancing direction and a delaying direction.) Thereafter, the light signals again interfere with each other at the mutual interference region, and at this time, depending on the voltage applied to the modulating electrodes 23, from which light guide 21 or 22 light is outputted is determined. As such, an optical switch function can be obtained.

In this optical switch element, a lens function could be provided while an optical switching function was maintained.

According to the present example, by integrally forming a lens at a light guide end portion of a light guide in an optical modulator or an optical switch element, at the output end of the optical modulator or optical switch element, an improvement in optical coupling efficiency with an optical fiber or another optical element can be realized. In addition, regulating processes such as an optical axis regulation can be simplified, thus an effect such as a reduction in manufacturing cost can be expected.

Example 2

Figure 5A:
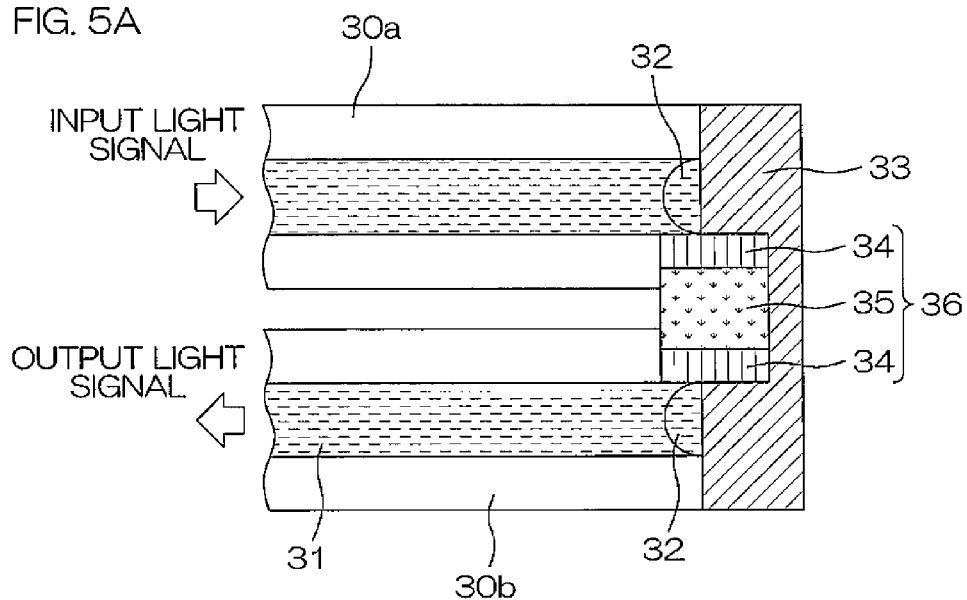
FIG. 5A is a sectional view showing a structure of a polarization controlling optical element wherein the end faces of two optical fibers have been vertically cut and made to contact with a reflecting plate, and an optical isolator 36 has been buried between both optical fiber end portions.
Figure 5B:
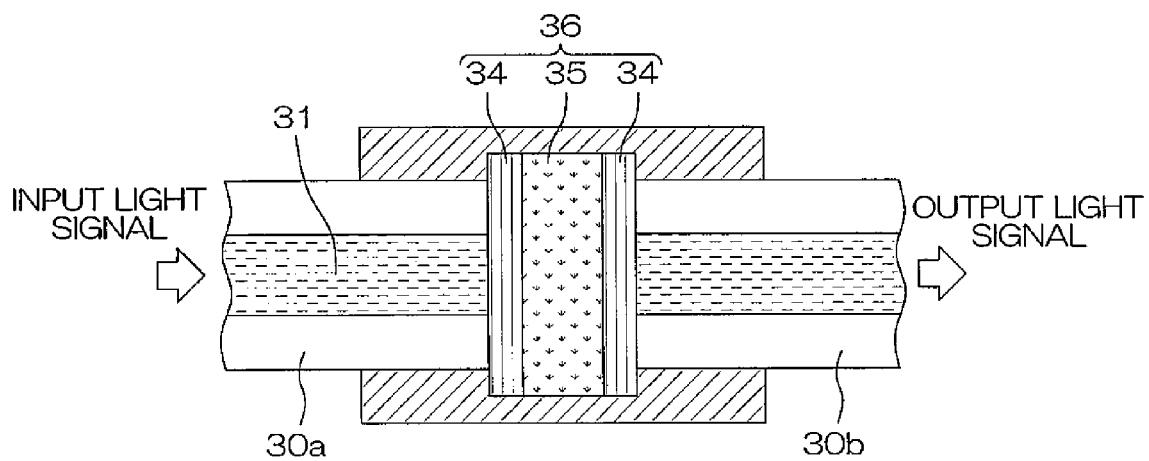
FIG. 5B is a sectional view showing a structure of a conventional polarizing control optical element.

FIG. 5A and FIG. 5B show sectional structures of polarization control optical elements for controlling a light signal, for which two optical fibers 30a and 30b have been connected to an optical isolator 36 composed of two polarizers 34 and a Faraday rotator 35.

FIG. 5A is a sectional view showing a structure of a polarization control optical element according to the present invention. End faces of two optical fibers 30a and 30b are vertically cut and are made to contact with a reflecting plate 33. Between end portions of both optical fibers 30a and 30b, an optical isolator 36 buried in a reflecting plate is arranged. A light propagating direction of the optical isolator 36 is vertical to a light propagating direction of the inside of the optical fibers 30a and 30b. Here, as a matter of course, polarizing directions of the two polarizers 34 are orthogonal to each other, and to the Faraday rotator 35 of the optical isolator 36, a magnetic field is applied in a predetermined direction.

FIG. 5B is a sectional view showing a structure of a conventional polarization control optical element. In this structure, end faces of two optical fibers 30a and 30b have been vertically cut, and therebetween, an optical isolator 36 has been inserted. A light propagating direction of the inside of the optical isolator 36 is identical to a light propagating direction of the inside of the optical fibers 30a and 30b.

Onto light guide end portions of the optical fibers 30a and 30b of FIG. 5A, a pulse laser light with a femtosecond-order pulse width was irradiated while being focused. The direction of irradiation was, for example, a vertical direction to the page surface. Thereby, refractive index of the irradiated portion was raised to form a photoinduced refractive-index changing region 32. This photoinduced refractive-index changing region 32 functions as a mirror or prism to reflect light and bends the propagating direction of light at a right angle. When an input light signal whose polarizing direction had already been known was introduced into the optical fiber 30a, a polarizing direction of a light signal to be outputted from the optical fiber 30b could be converted by the optical isolator 36 and be outputted from the optical fiber 30b.

In the conventional art of FIG. 5B, since the optical fibers 30a and 30b are connected to both surfaces of the optical isolator 36 so that the propagating directions of light become identical, the propagating direction of a light signal has been a single direction, a distance between the light signal input end and output end has been long, and the size of the optical element has also been large.

However, according to the present invention of FIG. 5A, by integrally forming the photoinduced refractive-index changing region 32 having a function as a mirror or prism at the light guide end portions of the optical fibers 30a and 30b, bending the propagating direction of a light signal by 90° at the light guide end portions, connecting the light signal to the optical isolator 36, and further bending the same by 90° after outputting the same from the optical isolator 36, the input-output direction of the light signal can be bent over by 180°. Accordingly, the input end and the output end of a light signal can be approximated, and the optical element can be reduced in size.

Example 3

Figure 6A:
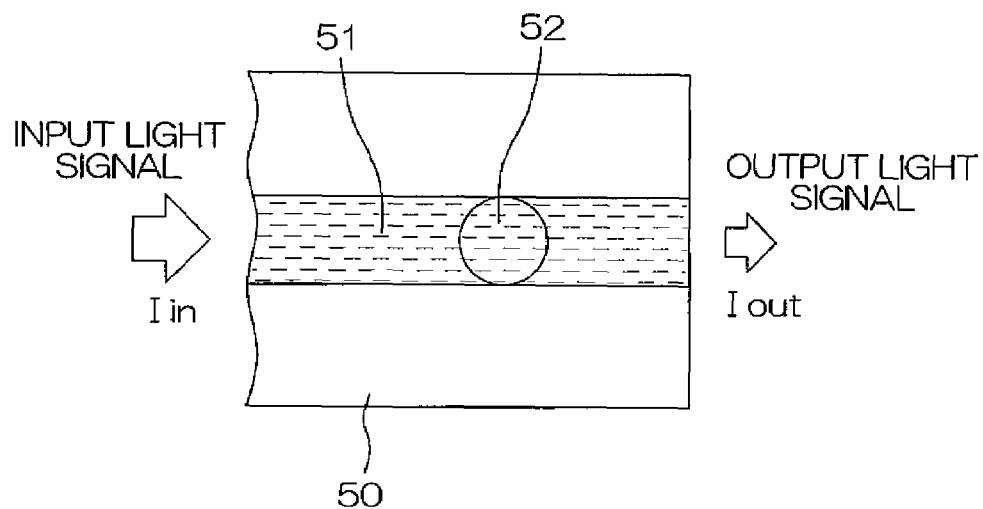
FIG. 6A is a sectional view showing a structure of an optical attenuator which has been provided with an optical attenuating function by forming a photoinduced refractive-index changing region 52 at a middle portion of an optical fiber light guide 51.
Figure 6B:
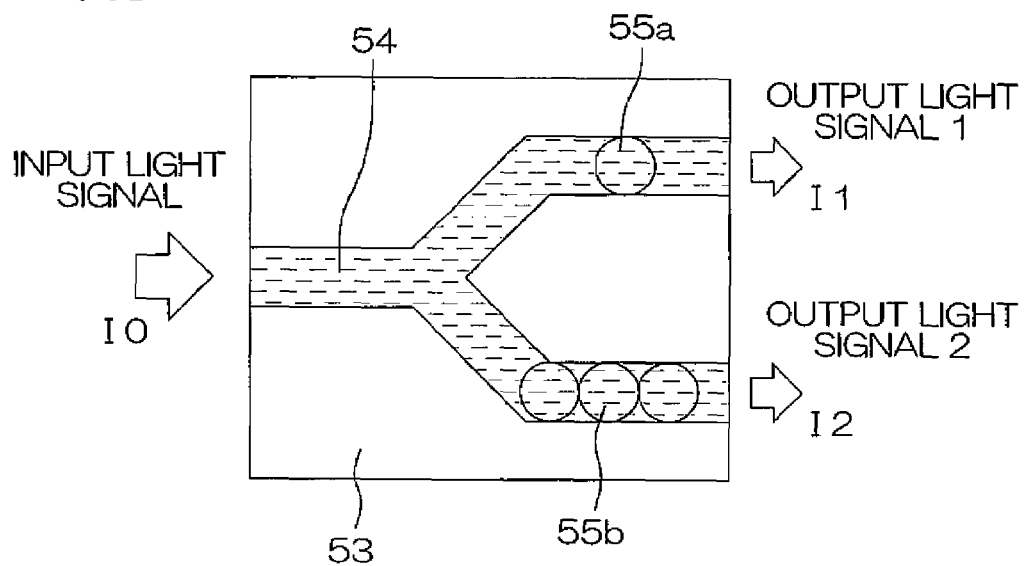
FIG. 6B shows a case where an optical element has a structure wherein a light guide 54 has been formed on an optical substrate 53 made of silica glass.

FIG. 6A and FIG. 6B show sectional views of structures of optical attenuators wherein an optical attenuating function has been provided for a light guide by integrally forming a photoinduced refractive-index changing region(s) at a light guide middle portion of an optical element.

FIG. 6A shows a case where the optical element is an optical fiber 50, and FIG. 6B shows a case where the optical element has been provided by forming a light guide 54 on an optical substrate 53. The light guide 54 is branched into two paths from a single path on the optical substrate 53.

In FIG. 6A, by irradiating while focusing a pulse laser light with a femtosecond-order pulse width, onto a middle portion of a light guide 51 of the optical fiber 50, in, for example, a vertical direction to the page surface, a photoinduced refractive-index changing region 52 has been formed. A light signal with an intensity Iin was inputted from one end of this optical fiber 50, and an intensity Iout of a light signal outputted from the other end was measured. As a result of a comparison between the input light signal intensity Iin and output light signal intensity Iout, Iin>Iout was confirmed. Accordingly, the light signal intensity could be attenuated. Based thereon, it is assumed that since the refractive index of the light guide 51 was raised at the photoinduced refractive-index changing region 52, light propagating conditions were changed at its boundary, a partial reflection and leak of the light signal occurred, thus this functioned as an optical attenuator to attenuate light.

In FIG. 6B, similar to the case of an optical fiber, by irradiating while focusing a pulse laser light with a femtosecond-order pulse width, onto a middle portion of a branched light guide 54, in, for example, a vertical direction to the page surface, photoinduced refractive-index changing regions 55a and 55b have been formed at the middle portion of the light guide. Here, the number of photoinduced refractive-index changing regions formed in the branched light guide is changed for each light guide path.

A light signal with an intensity I0 was inputted from an end portion of a single light guide side, and intensities I1 and I2 of light signals outputted from end portions of the branched light guide side were measured. As a result of a comparison between the input light signal intensity I0 and output light signal intensities I1 and I2, I0>I1>I2 was confirmed. Based thereon, it is assumed that light propagating conditions at the light guide middle portion of the light guide were changed to attenuate light signal intensity.

Here, in the present invention, without limitation to a light guide branched into two paths from a single path, the invention can also be applied to an optical integrated circuit composed of a light guide joined into a single path from a plurality of light guide paths or a single light guide branched into a plurality of paths.

According to the present invention, by integrally forming a photoinduced refractive-index changing region(s) in an optical fiber or at a light guide middle portion, an attenuator to attenuate light intensity could be integrally formed in the optical element.

Example 4

Figure 7:
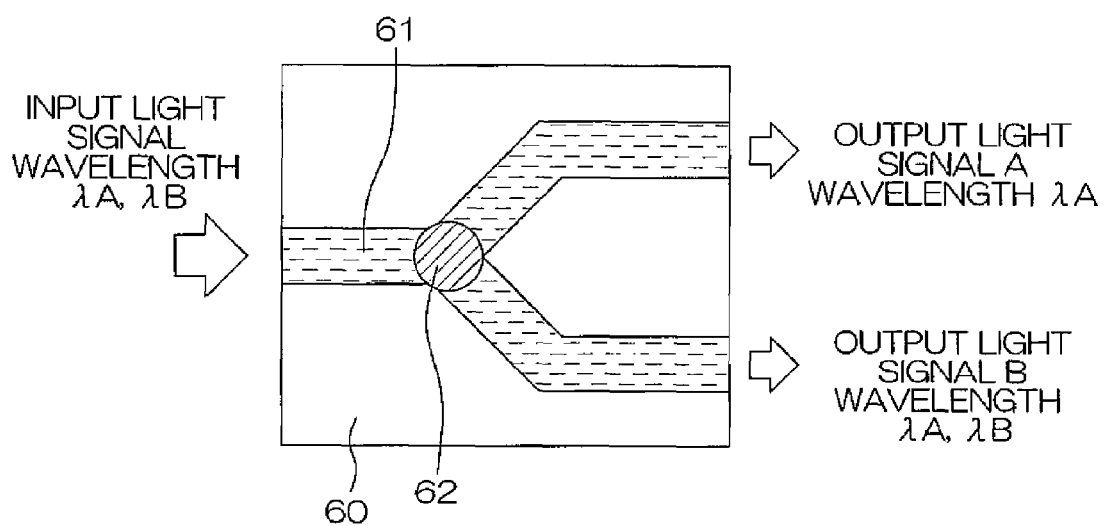
FIG. 7 is a plan view showing an optical element branching from a single light guide on an optical substrate 60, which is a plan view showing a structure wherein a photoinduced refractive-index changing region 62 which functions as a diffraction grating has been integrally formed by irradiating a pulse laser light onto a light guide branching portion of an optical element.

FIG. 7 is a plan view showing an optical element on which a light guide 61 has been formed on an optical substrate 60 made of silica glass. The light guide 61 is branched into two paths from a single path on the optical substrate.

Onto a branching portion of the light guide 61, a pulse laser light with a femtosecond-order pulse width was irradiated while being focused vertically to the page surface, whereby a photoinduced refractive-index changing region 62 was integrally formed.

In the present invention, when a light signal including light with two wavelengths λA and λB was inputted and passed through the photoinduced refractive-index changing region 62 formed at a light guide middle portion 62, a light signal with the wavelength λA was selected and branched.

Accordingly, it is understood that the photoinduced refractive-index changing region 62 formed at the light guide middle portion functions as a diffraction grating to select, from wavelengths of an inputted light, a light with a specific wavelength according to period intervals and amount of change in refractive index and change its direction. Here, the period intervals and amount of change in refractive index of this diffraction grating formed at a light guide branching portion can be easily regulated by changing pulse laser light irradiating conditions as will be described later.

Herein, description will be given of a phenomenon wherein a diffraction grating is formed at a photoinduced refractive-index changing region by irradiating while focusing a pulse laser light with a femtosecond-order ($10^{-12}$ to $10^{-15}$ seconds) pulse width onto the inside of an optical substrate in a specific polarizing mode.

The inventor has discovered that, at the above-described photoinduced refractive-index changing region, a periodic structure wherein high-refractive-index changing regions and low-refractive-index changing regions are repeatedly generated at pitches of 1 μm or less is formed.

In this periodic structure, planes wherein high-refractive-index changing regions or low-refractive-index changing regions are consecutive are defined as "principal planes." Here, since high-refractive-index changing regions and low-refractive-index changing regions are adjacently alternatively formed, defining planes wherein high-refractive-index changing regions are consecutive as "principal planes" and defining planes wherein low-refractive-index changing regions are consecutive as "principal planes" are substantially the same. However, for clarification of the definition, planes wherein high-refractive-index changing regions are consecutive will be referred to as "principal planes."

The above-described principal planes are formed parallel to a magnetic field direction of an irradiated pulse laser light. Since the pulse laser light is an electromagnetic wave, this has a property, while an electric field and a magnetic field maintain an orthogonal relationship, to propagate while changing at predetermined oscillation frequencies, respectively. This magnetic field direction of the pulse laser light is referred to as a "magnetic field direction" in the present specification.

The above-described periodic structure is formed by interference of the irradiated pulse laser light with plasma generated inside a light focusing position. Accordingly, only a single beam is sufficient for an irradiating pulse laser light.

As has been reported so far, an example wherein at least two or more beams of irradiating pulse laser light are used for irradiation and a periodic structure is formed by interference between these pulse laser light beams exists. In the present invention, since only a single pulse laser light beam is used, the device configuration and the like can be considerably simplified.

The pitches in the periodic structure are dependent on a wavelength, pulse number, or pulse energy of an irradiated pulse laser light.

The periodic structure is formed by interference of irradiated pulse laser light and plasma generated inside a light focusing position. Where a wavenumber vector of an irradiated pulse laser light is provided as $k_w$, a wavelength vector of generated plasma is provided as $k_p$, and a repeating modulation vector of high-refractive-index changing regions and low-refractive-index portions of a formed periodic structure is provided as $k_d$, the following expression (1) is obtained based on the law of conservation of momentum.

$$k_d = k_p - k_w \tag{1}$$

Here, where a wavelength of an irradiated pulse laser light is provided as $\lambda$, a relationship of $k_w = 2\pi/\lambda$ is obtained, and where pitches in a periodic structure are provided as $\hat{}$, a relationship of $k_d = 2\pi/\hat{}$ is obtained.

Accordingly, when the wavelength $\lambda$ of an irradiated pulse laser light is shortened, $k_w$ is increased and $k_d$ is reduced, and as a result, based on expression (1), the periodic structure pitches $\hat{}$ are increased.

In addition, when the pulse number and pulse energy of an irradiated pulse laser light are increased, an electron density $n_e$ and an electron temperature $T_e$ in the raised plasma are increased in proportion therewith, and $k_p$ is reduced. As a result, the modulation vector of a periodic structure $k_d$ is reduced, and the periodic structure pitches $\hat{}$ are increased.

Based on the above, when the wavelength $\lambda$ of an irradiated pulse laser light is shortened, the periodic structure pitches $\hat{}$ are increased, and also when the pulse number and pulse energy of an irradiated pulse laser light are increased, the periodic structure pitches $\hat{}$ are increased.

As such, according to the present example, by forming a diffraction grating at a light guide middle portion of a light guide, a wavelength filter to selectively branch a wavelength of light can be formed on the optical element.

Example 5

Figure 8A:
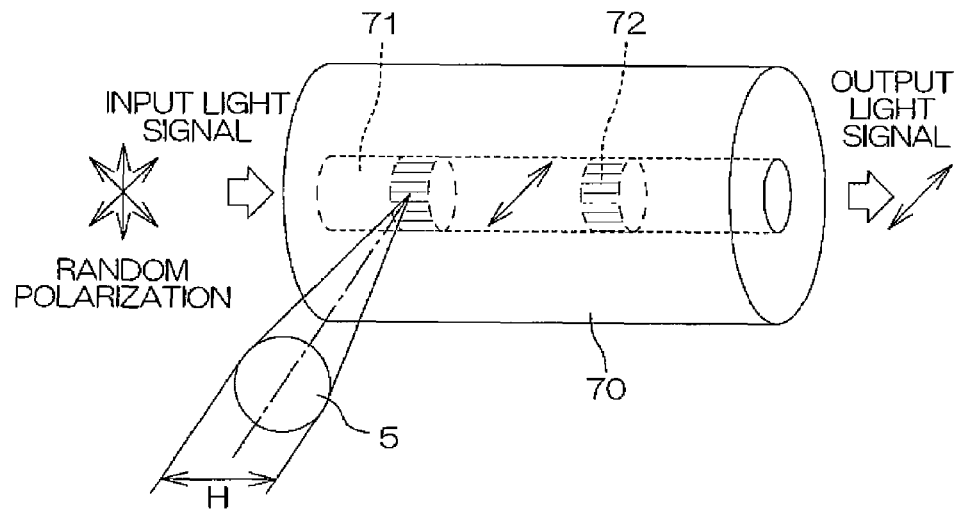
Figure 8B:
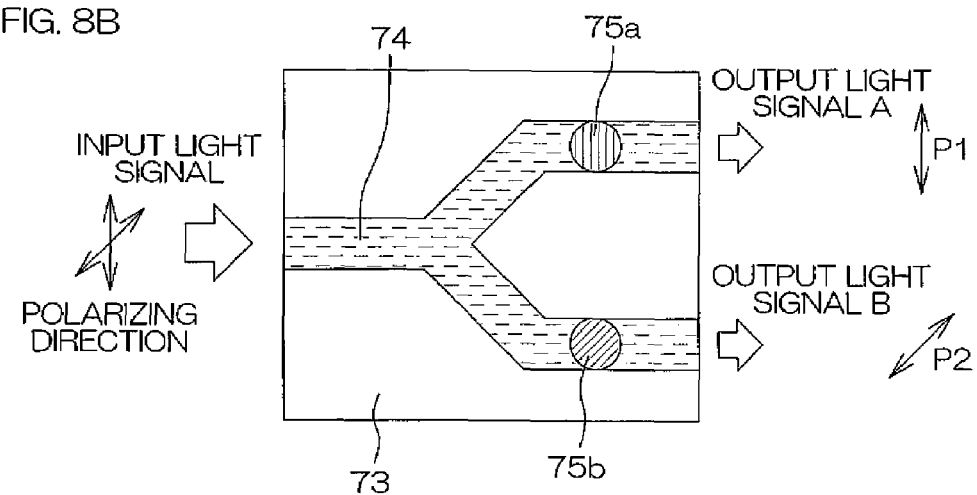

FIG. 8A and FIG. 8B show optical elements wherein a pulse laser light with a femtosecond-order pulse width has been irradiated while being focused onto a light guide to form a photoinduced refractive-index changing region(s) at a light guide middle portion. This photoinduced refractive-index changing region has a structure wherein high-refractive-index changing regions and low-refractive-index changing regions alternatively exist.

FIG. 8A shows a case where the optical element is an optical fiber 70, and FIG. 8B is a case where a light guide 74 has been formed on an optical substrate 73 made of silica glass. The optical guide 74 is branched into two paths from a single path on the optical substrate 73.

Principal planes with a fixed refractive index of a photoinduced refractive-index changing region 72 formed at a core 71 of the optical fiber 70 are provided so as to become horizontal as shown in FIG. 8A, for example.

A magnetic field direction of a pulse laser light is shown by "H" in FIG. 8A. The principal planes with a fixed refractive index of the photoinduced refractive-index changing region 72 have, as described in the foregoing, a property to be formed parallel to a direction of a magnetic field H of an irradiated pulse laser light. Accordingly, as shown in FIG. 8A, when a pulse laser light whose magnetic field direction is horizontal is horizontally irradiated, the principal planes with a fixed refractive index of the photoinduced refractive-index changing region can be horizontally formed.

As in the above, by horizontally forming the principal planes with a fixed refractive index of the photoinduced refractive-index changing region 72, of a light propagating through the optical fiber 70, only a horizontally polarized light can penetrate through this photoinduced refractive-index changing region 72.

In actually, when a randomly polarized light signal was inputted from an input end of an optical fiber wherein a photoinduced refractive-index changing region 72 had been formed at a middle portion of a core 71 and a polarizing direction of a light signal outputted from the other end was detected, a specific polarized component was selected. Based thereon, it is understood that the photoinduced refractive-index changing region 72 functions as a polarizer. Thereby, it has been confirmed that the photoinduced refractive-index changing region can select a specific polarized component of a light signal and functions as a polarization-plane maintaining fiber.

In the optical element of FIG. 8B, a pulse laser light with a femtosecond-order pulse width was irradiated while being focused onto the light guide 74, which was a light guide branched into two paths, to form photoinduced refractive-index changing regions 75a and 75b, respectively. At this time, a direction of a magnetic field H of the pulse laser light was made horizontal and vertical, respectively.

When a light signal was inputted from one end of the light guide 74 formed as such and polarizing directions of light signals outputted after being branched at a branching portion and passing through the photoinduced refractive-index changing regions 75a and 75b different in the polarizing directions were detected, respectively, it was confirmed that light of specific polarized components according to the polarizing directions of the photoinduced refractive-index changing regions 75a and 75b had been selected and outputted.

Here, in the present example, as well, without limitation to a light guide branched into two paths from a single path, the invention can also be applied to an optical integrated circuit composed of a light guide jointed into a single path from a plurality of light guide paths or a single light guide branched into a plurality of paths.

According to the present invention, by forming a photoinduced refractive-index changing region(s) at a light guide middle portion of a light guide, a polarizer function to select a specific polarized component of light can be provided for the optical element.

Example 6

FIG. 9 is a schematic view of an optical element wherein, by irradiating while focusing a pulse laser light with a femtosecond-order pulse width onto a boundary portion between a light guide 91 and a clad 90 of the optical element, a photoinduced refractive-index changing region 93 has been formed at the boundary portion between the light guide 91 and clad 90. To this photo induced refractive-index changing region 93, an optical fiber 92 has been connected from the upside of the optical element.

In this optical element, a light signal was inputted from one end of the light guide 91, and then a light signal outputted from the upper optical fiber was confirmed. Therefore, it is understood that this photoinduced refractive-index changing region 93 acts as a lens, prism, or half mirror and has a function to make a part of light penetrate and refract or reflect a part of light.

Accordingly, by forming a photoinduced refractive-index changing region 93 at a boundary portion between the light guide 91 and a clad, a light signal can be branched in a vertical direction.

According to the present example, a light signal can be easily taken out in a direction vertical to the light guide by a simple structure.

Example 7

FIG. 10 is a schematic view of an optical element wherein a photoinduced refractive-index changing region 103 has been formed by irradiating while focusing a pulse laser light with a femtosecond-order pulse width onto a boundary portion between a light guide 101 and a clad 100 of the optical element. To this photoinduced refractive-index changing region 103, an optical fiber 102 has been connected from the upside of the optical element.

In this optical element, a light signal was inputted from one end of the light guide 101 and intensities of light signals outputted from the other end of the light guide and the upper optical fiber 102 were detected. As a result of a measurement of a light signal B (intensity IB) outputted from the light guide and a light signal A (intensity IA) outputted while being branched into the optical fiber, a relationship of I0>IB>IA was obtained in terms of an input signal I0. It is understood that this photoinduced refractive-index changing region 103 acts as a lens, prism, or half mirror and has a function to make a part of light penetrate and refract or reflect a part of light.

According to the present example, by forming a photoinduced refractive-index changing region at a boundary portion between the light guide and clad, a light signal can be easily branched in a direction vertical to the light guide. Furthermore, the intensity of a branched light signal results in that of an attenuated light signal, light branching and attenuating functions could be integrated.

Example 8

Figure 11:
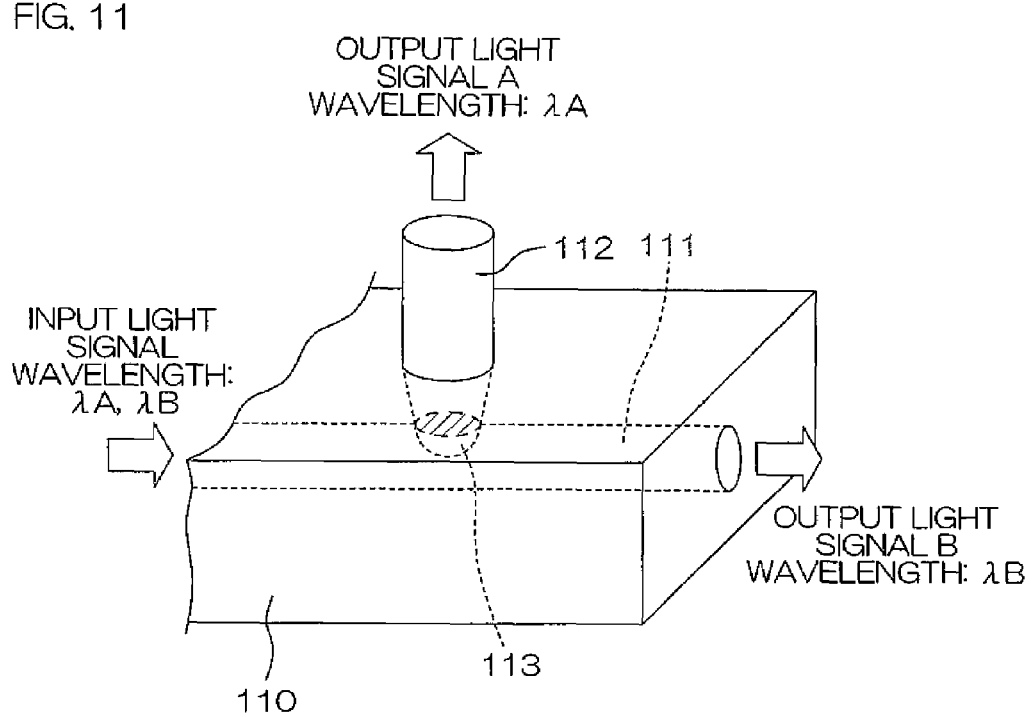
FIG. 11 is a perspective view of an optical element wherein a photoinduced refractive-index changing region 113 has been formed by irradiating while focusing a pulse laser light with a femtosecond-order pulse width onto a boundary portion between a light guide 111 of the optical element and a clad 110.

FIG. 11 is a perspective view showing an optical element wherein a photoinduced refractive-index changing region 113 has been formed by irradiating while focusing a pulse laser light with a femtosecond-order pulse width onto a boundary portion between a light guide 111 and a clad 110 of the optical element. To this photoinduced refractive-index changing region 113, an optical fiber 112 has been connected from the upside of the optical element.

In this optical element, a multi-wavelength light signal including a light with a wavelength λA and a light a wavelength λB was inputted from one end of the light guide 111, and wavelengths of light signals outputted from the other end of the light guide 111 and the upper optical fiber 112 were measured by a spectroscope, respectively.

The wavelength of a light signal branched halfway through the light guide 111 and outputted into the optical fiber 112 was of λA, and the wavelength of a light signal outputted from the other end of the light guide 111 was of λB. Accordingly, it is considered that this photoinduced refractive-index changing region 113 has a function as a diffraction grating to separate a specific wavelength.

According to the present example, by forming a photoinduced refractive-index changing region at a boundary portion between the light guide and clad, a light signal could easily be branched in a direction vertical to the light guide. Furthermore, a wavelength of the branched light signal can be separated, and light branching and wavelength filter functions can be integrated, therefore, an effect such as a reduction in size and in manufacturing cost of the optical element can be expected.

Example 9

Figure 12:
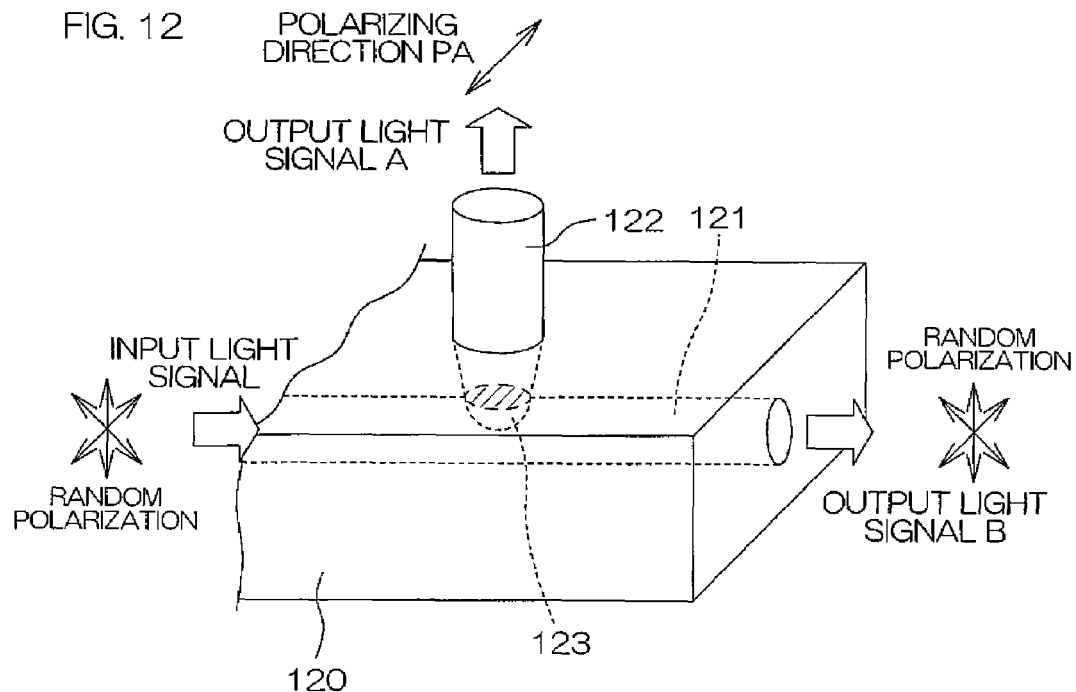
FIG. 12 is a perspective view of an optical element wherein a photoinduced refractive-index changing region 123 has been formed by irradiating while focusing a pulse laser light with a femtosecond-order pulse width onto a boundary portion between a light guide 121 of the optical element and a clad 120.

FIG. 12 is a perspective view showing an optical element wherein a photoinduced refractive-index changing region 123 has been formed by irradiating while focusing a pulse laser light with a femtosecond-order pulse width onto a boundary portion between a light guide 121 and a clad 120 of the optical element. To this photoinduced refractive-index changing region 123, an optical fiber 122 has been connected from the upside of the optical element.

In this optical element, a light signal including a randomly polarized light was inputted from one end of the light guide 121, and polarizing directions of light signals outputted from the other end of the light guide 121 and the upper optical fiber 122 were measured by an analyzer.

The polarizing direction of a light signal outputted from the other end of the light guide 121 was random, whereas the polarizing direction of a light signal branched and outputted into the optical fiber 122 was a specific polarizing direction. Accordingly, it is considered that this photoinduced refractive-index changing region 123 has a function as a polarizer to separate a light in a specific polarizing direction.

According to the present invention, by forming a photoinduced refractive-index changing region at a boundary portion between the light guide and clad, only a light signal in a specific polarizing direction can be branched in a direction vertical with the light guide. Accordingly, light branching and polarizer functions can be integrated.

Example 10

Figure 13A:
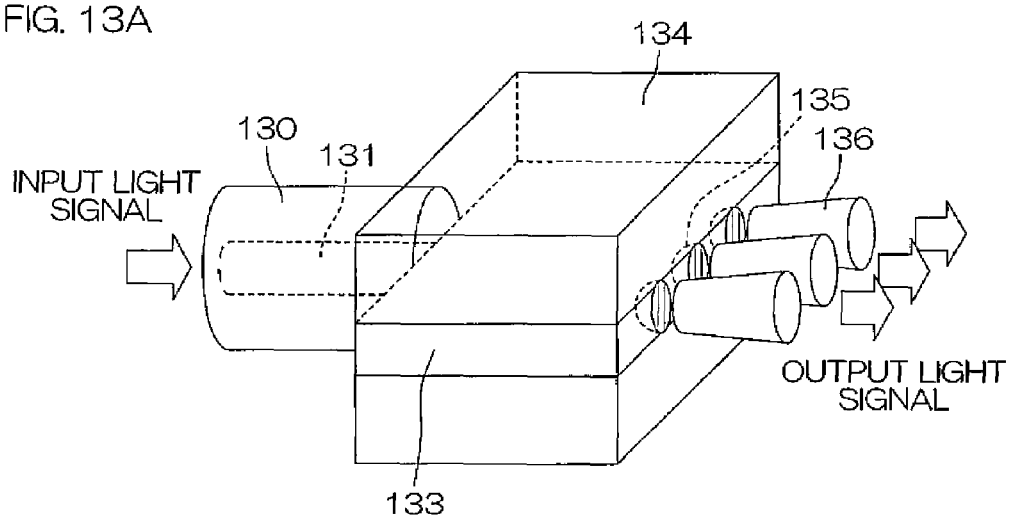
Figure 13B:
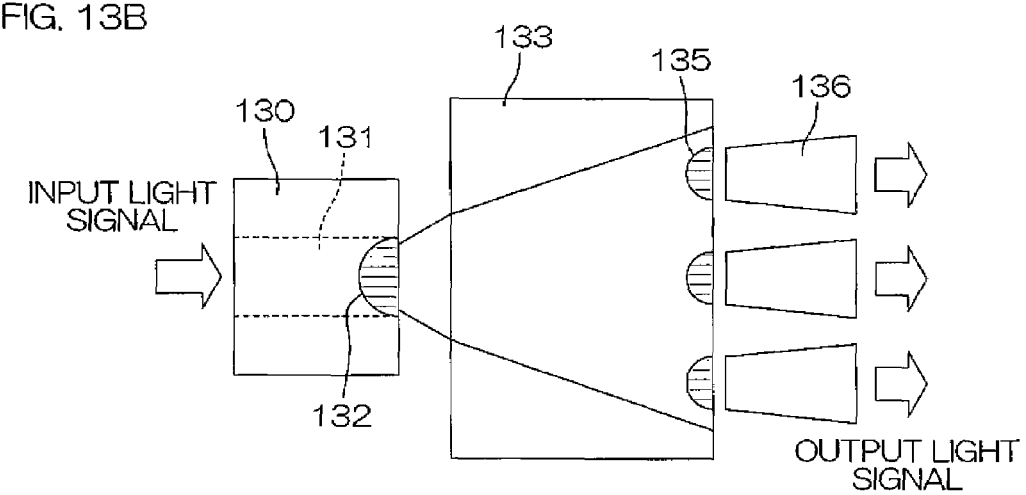

FIG. 13A and FIG. 13B show an optical element having a two-dimensionally expanding plate-like light guide 133 and clads 134 sandwiching the top and bottom of the light guide 133.

FIG. 13A shows a perspective view of the optical element, and FIG. 13B shows a horizontal sectional view showing a condition where an incident optical fiber 130 and exiting optical fibers 136 have been connected to the optical element.

By irradiating while focusing a pulse laser light with a femtosecond-order pulse width onto an exiting end portion of a core of the incident optical fiber 130, a photoinduced refractive-index changing region 132 has been formed. In addition, onto an end portion of the light guide of this optical element, as well, a plurality of photoinduced refractive-index changing regions 135 have been formed by irradiating while focusing a pulse laser light with a femtosecond-order pulse width.

A light signal inputted through the incident optical fiber 130 connected to this optical element is expanded by the photoinduced refractive-index changing region 132 formed at the core end portion of the incident optical fiber 130 and is made incident into the plate-like light guide 133 of the optical element. The light signal made incident into the plate-like light guide 133 propagates to the other end portion while expanding uniformly. Then, the light signal is focused at the respective photoinduced refractive-index changing regions 135 formed at the other end portion and is outputted into the exiting optical fiber 136. The photoinduced refractive-index changing regions 132 and 135 have a lens function to converge and disperse light.

In this example, by forming the photoinduced refractive-index changing region at a light guide end portion of an optical fiber, a coupling loss between the optical fiber and plate-like light guide of the optical element could be reduced. Furthermore, by the photoinduced refractive-index changing regions formed at the plate-like light guide end portion of the optical element, a light signal uniformly propagating through the plate-like light guide could be focused and be outputted into the exiting optical fiber with a small loss.

Thus, according to the present invention, an optical branching coupler with a small coupling loss can be fabricated.

Example 11

Figure 14A:
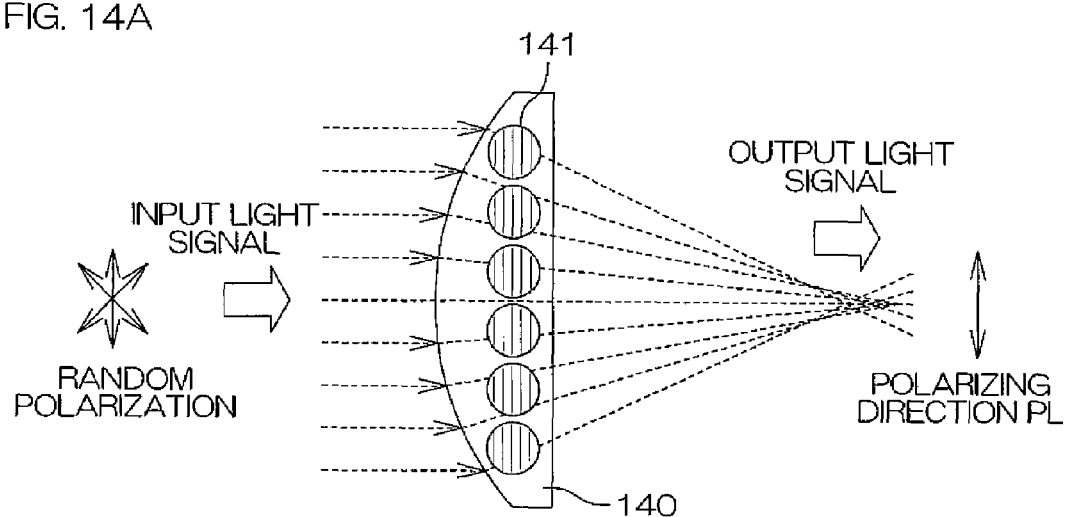
Figure 14B:
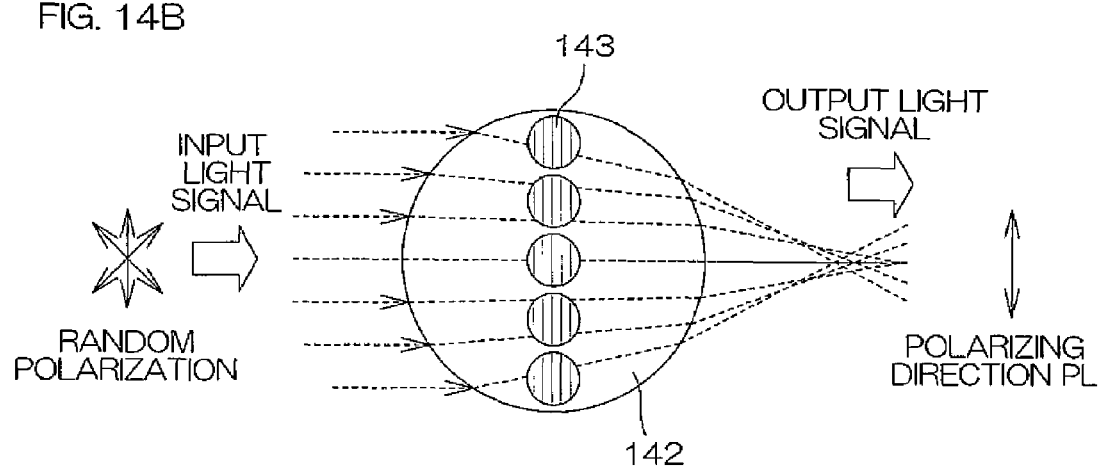

FIG. 14A and FIG. 14B are side views showing an optical element wherein multiple photoinduced refractive-index changing regions 141 or 143 have been formed by irradiating while focusing a pulse laser light with a femtosecond-order pulse width onto the inside of a spherical lens (which may be an aspherical lens) 140 or ball lens 142.

FIG. 14A shows a case where the optical element is a spherical lens 140, and FIG. 14B shows a case wherein the optical element is a ball lens 142.

By forming photoinduced refractive-index changing regions 141 or 143 inside the spherical lens 140 or ball lens 142, a function as a polarizer can be provided for the lens function. As a forming method for a polarizer, similar to the description by use of FIG. 8A, this is formed by irradiating a pulse laser light having a predetermined magnetic field direction while utilizing such a property that a polarizing direction of a photoinduced refractive-index changing region is formed parallel to a direction of a magnetic field H of an irradiated pulse laser light.

An optical element with this construction can focus an inputted light signal and also select a light in a specific polarizing direction from an inputted light with random polarization.

Thus, according to the present example, since a lens function and a polarizer function can be integrated, an effect such as a reduction in size and multifunctionalization of an optical element can be expected.

In the above, although embodiments of the present invention have been described, embodiments of the present invention are not limited to those as described above and various modifications can be applied within the scope of the present invention.

The disclosure of Japanese Patent Application No. 2004-105891 filed on Mar. 31, 2004 is incorporated herein by reference.

What is claimed is:

1. An optical element which is fabricated by use of an optical substrate comprising:
   a light guide formed on the optical substrate, and
   a photoinduced refractive-index changing region existing in the light guide, wherein
   the photoinduced refractive-index changing region exists at a boundary portion between the light guide and the optical substrate surrounding the same, and
   the photoinduced refractive-index changing region is formed by irradiating, with a focused pulse laser light, the boundary portion of the light guide having an energy amount to cause a photoinduced change in refractive index,
   wherein the photoinduced refractive-index changing region comprises a lens, and
   the photoinduced refractive-index changing region is provided by forming high-refractive-index changing regions and low-refractive-index changing regions repeatedly formed at pitches of 1 μm or less.

2. The optical element as set forth in claim 1, wherein the photoinduced refractive-index changing region has a light focusing function to focus light propagating through the light guide, a refracting function to refract light propagating through the light guide, a reflecting function to reflect light propagating through the light guide, an optical diffracting function to diffract light propagating through the light guide, an optical attenuating function to attenuate light propagating through the light guide, a wavelength filter function to select a light with a specific wavelength propagating through the light guide, or a polarizing function to transmit a light in a specific polarizing direction propagating through the light guide.

3. The optical element as set forth in claim 1, wherein the optical element is an optical fiber, and the light guide is an optical fiber core.

4. The optical element as set forth in claim 1, wherein the light guide is a buried or protruded light guide formed on the optical substrate.

5. The optical element as set forth in claim 1, wherein the light guide is a plate-like light guide formed on the optical substrate.

6. The optical element as set forth in claim 4, wherein the light guide is branched on the optical substrate or inside the optical substrate.

7. The optical element as set forth in claim 6, wherein the photoinduced refractive-index changing region has been formed in the branched light guide.

8. The optical element as set forth in claim 6, wherein the photoinduced refractive-index changing region has been formed at a branching portion of the branched light guide.

9. The optical element as set forth in claim 1, wherein modulating electrodes have been formed on the light guide.

10. The optical element as set forth in claim 3, wherein a plurality of optical fibers each provided with a photoinduced refractive-index changing region formed at a core end portion thereof are arranged while making the end portions contact with a reflecting member.

11. The optical element as set forth in claim 10, wherein a polarization-plane rotating element has been coupled between the end portions of the plurality of optical fibers.

12. The optical element as set forth in claim 1, wherein another optical element has been connected to a position where the photoinduced refractive-index changing region of the light guide has been formed.

13. The optical element as set forth in claim 1, wherein the optical substrate is glass consisting mainly of $SiO_2$.

14. The optical element as set forth in claim 1, wherein the optical substrate is an organic material of one or more selected from polyethylene terephthalate, polyacetal, polycarbonate, polyfluorocarbonate, polyamide, polyimide, silicone, polyphenylene oxide, polysulfone, polyphenylene sulfide, polybutylene terephthalate, polyarylate, polyamideimide, polyether sulfone, polyarylate, polyetherketone, polyetherimide, polymethyl methacrylate, polyacrylate, crosslinked acrylate, polysiloxane, norbornene, an epoxy resin, a phenoxy resin, triacetylcellulose, and fluorine-denatured substances of these or an organic material mixed with at least two or more of these.

15. The optical element as set forth in claim 1, wherein the optical substrate is a $\beta\text{-}BaB_2O_4$ crystal, a $LiNbO_3$ crystal, a $LiTaO_3$ crystal, a $KH_2PO_4$ crystal, a $Bi_{12}SiO_{20}$ crystal, a $Bi_4Ge_3O_{12}$ crystal, or a quartz crystal.

16. An optical device mounted with the optical element as set forth in claim 1.

17. The optical element as set forth in claim 1, wherein the photoinduced refractive-index changing region is a hemisphere lens.

* * * * *